No. 866,062. PATENTED SEPT. 17, 1907.
H. E. PIERCE.
STUFFING BOX.
APPLICATION FILED JUNE 22, 1907.
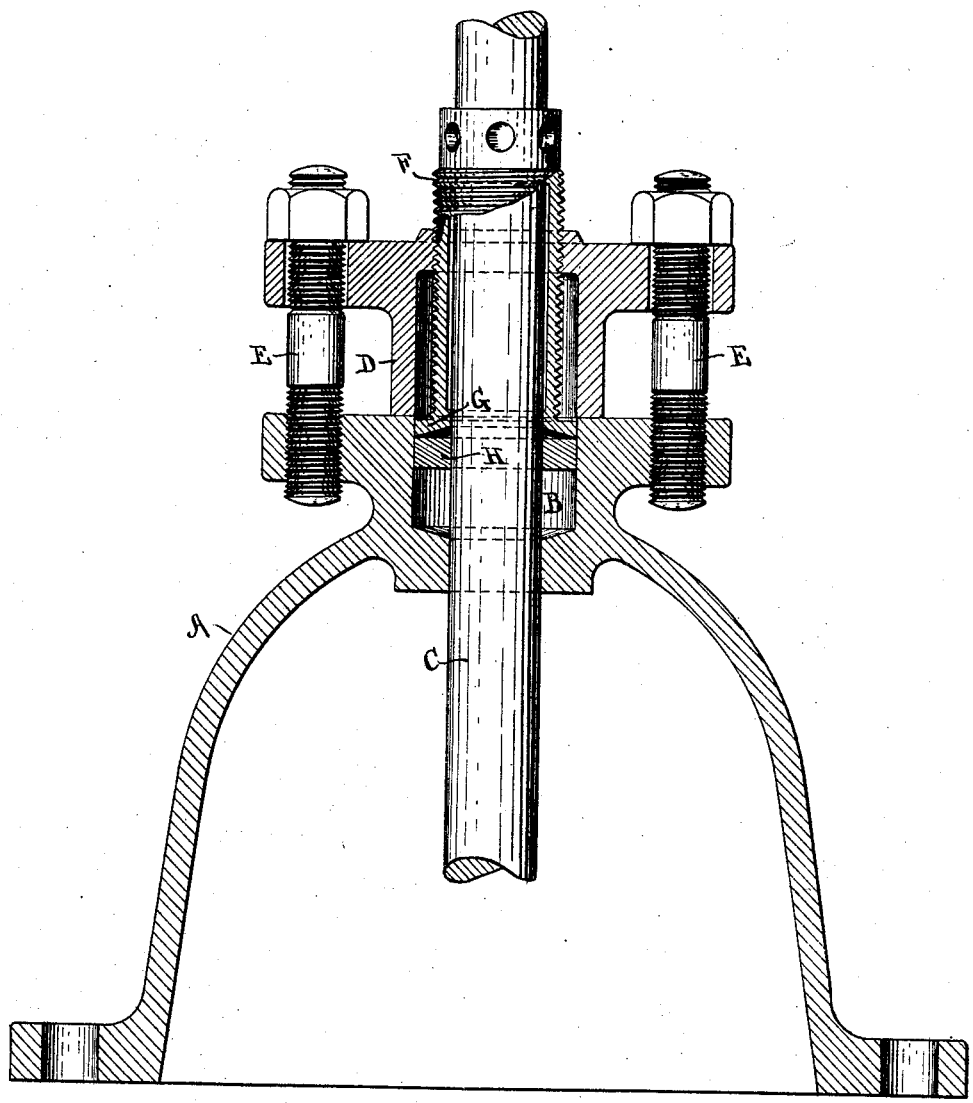
WITNESSES:
INVENTOR
Howard E. Pierce
BY
Eugene Diven
ATTORNEY

UNITED STATES PATENT OFFICE.

HOWARD E. PIERCE, OF ELMIRA, NEW YORK.

STUFFING-BOX.

No. 866,062.  Specification of Letters Patent.  Patented Sept. 17, 1907.

Application filed June 22, 1907. Serial No. 380,248.

*To all whom it may concern:*

Be it known that I, HOWARD E. PIERCE, a citizen of the United States, residing at Elmira, in the county of Chemung and State of New York, have invented certain new and useful Improvements in Stuffing-Boxes, of which the following is a specification.

This invention relates to improvements in stuffing boxes for valves, cylinders, and the like; and more particularly to stuffing boxes adaptable for use in connection with valve stems, piston rods, and the like, operating under steam or other fluid pressures; my object being to so arrange the parts of the device that the stuffing box may be readily packed when under pressure.

I attain my object by arranging the device in the manner illustrated in the accompanying drawing, in which I have shown a section through a valve cap having my improved stuffing box applied thereto.

The valve cap A is such as is ordinarily applied to any of the common forms of gate valves; or it might be the head of a cylinder, or a cap of any other form. This cap is provided with a stuffing box at B, through which the valve stem C passes. At the outer end of the stuffing box I provide a chambered cap D, the rim of which is clamped against the outside face of the stuffing box by means of the stud bolts E, the cap being set up snugly against the stuffing box by means of nuts applied to the outer ends of said bolts.

The diameter of the chamber in the cap D corresponds with the diameter of the bore of the stuffing box; and screwed into the outer end of this cap is a follower F, which fits around the valve stem and is provided at its inward end with a head G, which fits the corresponding bores of the chamber and stuffing box. Spanner holes, at the outward end of the follower, are provided for turning it, to advance or retract the head G in operating the device.

H represents a packing ring of any approved form. To pack the stem, when under steam pressure, the nuts are removed from the studs E and the cap D moved away from the stuffing box; the head G of the follower having been first drawn back into the chamber in the cap. Packing rings are then sprung around the valve stem, which can be readily done by means of packing hooks, while the steam is escaping; these packing rings being pressed back into the chamber in the cap. The pressure of the escaping steam assists in so inserting the rings. When sufficient packing rings have been inserted in the chamber to properly fill the stuffing box, the cap is again pushed into position against the stuffing box, and set up thereagainst by means of the nuts applied to the studs E. The follower F is then screwed in, thereby forcing the packing rings from the cap into the stuffing box, and compressing said rings until the joint is made steam tight.

While I have described this device herein as applied to packing a steam joint around a valve stem, it will also be understood that it may be applied equally well for packing any other similar joint, and where other fluids, such as gas and water, under pressure are employed. As the packing wears away, the joint is kept tight by setting up the follower from time to time, until the packing is used up and it becomes necessary to renew it. The joint between the cap D and the stuffing box can be readily broken at any time, as it is of such a nature that it cannot corrode and stick. This cap and follower may readily be substituted for the ordinary form of packing gland, as will be readily understood by those familiar with the art.

What I claim as my invention is:—

1. The combination, with a stuffing box, of a cap having a chamber of the same diameter as the stuffing box, a follower in said chamber adapted to be projected into the stuffing box, means for fastening the cap upon the stuffing box with the chamber in register therewith, and means outside the cap for advancing and retracting the follower.

2. The combination, with a stuffing box, of a cap having a chamber of the same diameter as the stuffing box, a follower in said chamber adapted to be projected into the stuffing box, said follower passing out through the outer end of the cap and having screw-threaded engagement therewith, means outside the cap for turning the follower in either direction, and means for fastening the cap upon the stuffing box with its chamber in register therewith.

In testimony whereof I have affixed my signature, in presence of two witnesses.

HOWARD E. PIERCE.

Witnesses:
 A. S. DIVEN,
 M. E. VERBECK.